(12) United States Patent
Tomita et al.

(10) Patent No.: US 6,690,881 B1
(45) Date of Patent: Feb. 10, 2004

(54) DIGITAL CAMERA APPARATUS AND RECORDING METHOD THEREOF

(75) Inventors: Yoshinori Tomita, Kanagawa (JP); Shigeki Ishizuka, Kanagawa (JP); Katsuhiko Ueno, Kanagawa (JP); Yoshihiro Ono, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/378,585

(22) Filed: Aug. 20, 1999

(30) Foreign Application Priority Data

Aug. 24, 1998 (JP) .......................................... 10-237311
Aug. 24, 1998 (JP) .......................................... 10-237312

(51) Int. Cl.[7] ............................ H04N 5/225; H04N 5/76
(52) U.S. Cl. ..................................... 386/117; 386/107
(58) Field of Search ............................... 386/117, 107, 386/104, 96, 98, 102, 109, 111, 112, 46, 39, 38, 33, 27, 1; 358/906, 909.1; 348/222.1, 231.99, 231.3, 231.4; H04N 5/225, 5/76

(56) References Cited

U.S. PATENT DOCUMENTS 5,032,927 A * 7/1991 Watanabe et al.
5,377,051 A * 12/1994 Lane et al.
5,583,652 A * 12/1996 Ware
5,617,145 A * 4/1997 Huang et al.
5,987,179 A * 11/1999 Riek et al.

* cited by examiner

Primary Examiner—Robert Chevalier
(74) Attorney, Agent, or Firm—Frommer Lawrence & Haug LLP; William S. Frommer; Gordon Kessler

(57) ABSTRACT

A camera apparatus for encoding a video signal received from a photographing unit in MPEG video format or equivalent format, encoding an audio signal received from an audio inputting unit in MPEG audio format or equivalent format, multiplexing the encoded MPEG video signal and the encoded MPEG audio signal, storing the multiplexed data to a memory is disclosed, that comprises an I picture generating unit for encoding the video signal received from the photographing unit corresponding to an intra-frame encoding process so as to generate an I picture in the MPEG video format or equivalent format, and a controlling unit for controlling a storing process of the multiplexed data to the memory, wherein said controlling unit generates a P picture or a B picture in the MPEG video format or equivalent format in such a manner that moving vectors of all macro blocks thereof are 0 and the chronologically preceding picture is copied as an encoded picture, wherein said controlling unit encodes the audio signal received from the audio inputting unit in the MPEG audio format or equivalent format so as to generate MPEG audio data, and wherein said controlling unit multiplexes the I picture, the P picture or the B picture, and the MPEG audio data so as to generate the multiplexed data.

18 Claims, 6 Drawing Sheets

DIGITAL CAMERA APPARATUS AND RECORDING METHOD THEREOF

BACKGROUND OF THE INVENTION

1. Field of the Invention

The present invention relates to a camera apparatus for recording a photographed still picture to a record medium and a recording method thereof.

2. Description of the Related Art

Digital cameras that record digital picture information to record mediums such as a floppy disk and a semiconductor memory are becoming common. A digital camera converts a photographed picture into a digital picture signal, compresses the digital picture signal, and records the compressed picture information to a record medium. A digital camera can also record a moving picture as well as a still picture.

JPEG (Joint Photographic Experts Group) format that is a format for compressing a still picture and MPEG (Moving Picture Experts Group) format are general-purpose encoding formats adopted by ISO. These formats are suitable for picture data photographed by a digital camera and used in a personal computer. In the JPEG format, a color still picture is compression-encoded by DCT (Discrete Cosine Transform) method. Coefficient data is quantized. The quantized output is encoded with variable length code. In contrast, in the MPEG format, a color moving picture is compression-encoded. In other words, a frame difference between an input picture and a motion-compensated predictive picture is compression-encoded by DCT method. When a digital camera can record a still picture and an audio signal corresponding thereto, a memo of a still picture can be recorded as an audio signal. However, since the JPEG format is designed to record and transmit information of still pictures, audio information corresponding to still pictures cannot be simultaneously recorded and transmitted. Likewise, in other still picture formats (GIF, TIFF, BMP, and so forth), a still picture and audio information corresponding thereto cannot be simultaneously recorded and transmitted. Although software that allows a still picture and audio information corresponding thereto to be simultaneously recorded and transmitted is known (for example, Exif V.20), it is not common. Even if audio attached still picture data is created in the format of such software, software for a player that reproduces the audio attached still picture data is not easily available.

In the MPEG format, there are three types of pictures that are an I picture (Intra-coded picture), a P picture (Predictive-coded picture), and a B picture (Bidirectionally predictive-coded picture).

In the MPEG format, when a P picture or a B picture is processed, since these pictures use an inter-frame motion compensation predictive process, the circuit scale of an encoder/decoder becomes large and the number of a software process steps remarkably increases. Thus, such a process is not suitable for a small, light, and inexpensive recording/reproducing apparatus such as a digital camera. To solve such a problem, it is necessary to generate an MPEG stream composed of only I pictures. However, MPEG1 (ISO-1172-2) standard defines that the minimum frame rate is 23.97 MHz. Thus, it is difficult to form a stream composed of only I pictures without P pictures or B pictures due to the restriction of the frame rate.

Therefore, an object of the present invention is to provide a camera apparatus and a recording method thereof corresponding to the MPEG format without increasing the circuit scale and the number of process steps.

Another object of the present invention is to provide a camera apparatus and a recording method thereof that encode a still picture and audio information corresponding thereto in MPEG format that is a general-purpose format.

Another object of the present invention is to provide a camera apparatus and a recording method thereof that allow the structure of an encoder/decoder that encode a moving picture signal in the MPEG format and a still picture signal in the JPEG format to be simplified.

Another object of the present invention is to provide a camera apparatus and a recording method thereof that simultaneously record a photographed still picture and audio information corresponding thereto.

OBJECTS AND SUMMARY OF THE INVENTION

To accomplish the above-described objects, a first aspect of the present invention is a camera apparatus for encoding a video signal received from a photographing means in MPEG video format or equivalent format, encoding an audio signal received from an audio inputting means in MPEG audio format or equivalent format, multiplexing the encoded MPEG video signal and the encoded MPEG audio signal, storing the multiplexed data to a memory means, the camera apparatus comprising an I picture generating means for encoding the video signal received from the photographing means corresponding to an intra-frame encoding process so as to generate an I picture in the MPEG video format or equivalent format, and a controlling means for controlling a storing process of the multiplexed data to the memory means, wherein said controlling means generates a P picture or a B picture in the MPEG video format or equivalent format in such a manner that moving vectors of all macro blocks thereof are 0 and the chronologically preceding picture is copied as an encoded picture, wherein said controlling means encodes the audio signal received from the audio inputting means in the MPEG audio format or equivalent format so as to generate MPEG audio data, and wherein said controlling means multiplexes the I picture, the P picture or the B picture, and the MPEG audio data so as to generate the multiplexed data.

A second aspect of the present invention is a camera apparatus for encoding a video signal received from a photographing means and an audio signal received from an audio inputting means and storing the encoded signals to a memory means, the camera apparatus comprising a video encoding means for encoding the video signal received from the photographing means corresponding to a first encoding method or a second encoding method and generating first encoded video data or second encoded video data, respectively, a controlling means for controlling a storing process of data to the memory means and selecting the first encoding method or the second encoding method corresponding to a selected record mode, wherein said controlling means controls said video encoding means so as to encode the video signal corresponding to the first encoding method when a mode for recording only video data has been selected in the camera apparatus, and wherein said controlling means controls said video encoding means so as to encode the video signal corresponding to the second encoding means when a mode for recording both video data and audio data has been selected in the camera apparatus.

A third aspect of the present invention is a recording method for a camera apparatus for encoding a video signal received from a photographing means in MPEG video format or equivalent format, encoding an audio signal received from an audio inputting means in MPEG audio format or equivalent format, multiplexing the encoded MPEG video signal and the encoded MPEG audio signal, storing the multiplexed data to a memory means, the recording method comprising the steps of encoding the video signal received from the photographing means corresponding to an intra-frame encoding process so as to generate an I picture in the MPEG video format or equivalent format, generating a P picture or a B picture in the MPEG video format or equivalent format in such a manner that moving vectors of all macro blocks thereof are 0 and the chronologically preceding picture is copied as an encoded picture, encoding the audio signal received from the audio inputting means in the MPEG audio format or equivalent format so as to generate MPEG audio data, multiplexing the I picture, the P picture or the B picture, and the MPEG audio data so as to generate the multiplexed data, and storing the multiplexed data to the memory means.

A fourth aspect of the present invention is a recording method for a camera apparatus for encoding a video signal received from a photographing means and an audio signal received from an audio inputting means and storing the encoded signals to a memory means, the recording method comprising the steps of encoding the video signal received from the photographing means corresponding to a first encoding method and storing the encoded video data to the memory means when a mode for recording only video data has been selected in the camera apparatus, and encoding the video signal received from the photographing means corresponding to a second encoding method and storing the encoded video data to the memory means along with the encoded audio data when a mode for recording both video data and audio data has been selected in the camera apparatus.

According to the first aspect and the third aspect of the present invention, since the motion compensation interframe predictive process is not performed, the hardware scale and the number of process steps of software can be remarkably decreased. In addition, since encoded output data in the MPEG format or equivalent format can be obtained, the encoded output data can be easily used by a personal computer. With a small scale of hardware or a small number of process steps of software, as functions of a digital still camera, a moving picture recording function can be provided along with a still picture recording function. In addition, since the amount of code that is generated is small, a photographed moving picture can be recorded to an external storing medium.

According to the second aspect and the fourth aspect of the present invention, a function for simultaneously recording a still picture and an audio signal can be accomplished for a digital camera. In addition, when an audio attached still picture is recorded, only a still picture can be recorded. Thus, corresponding to a desired application, recorded data can be used.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENTS

Figure 1:
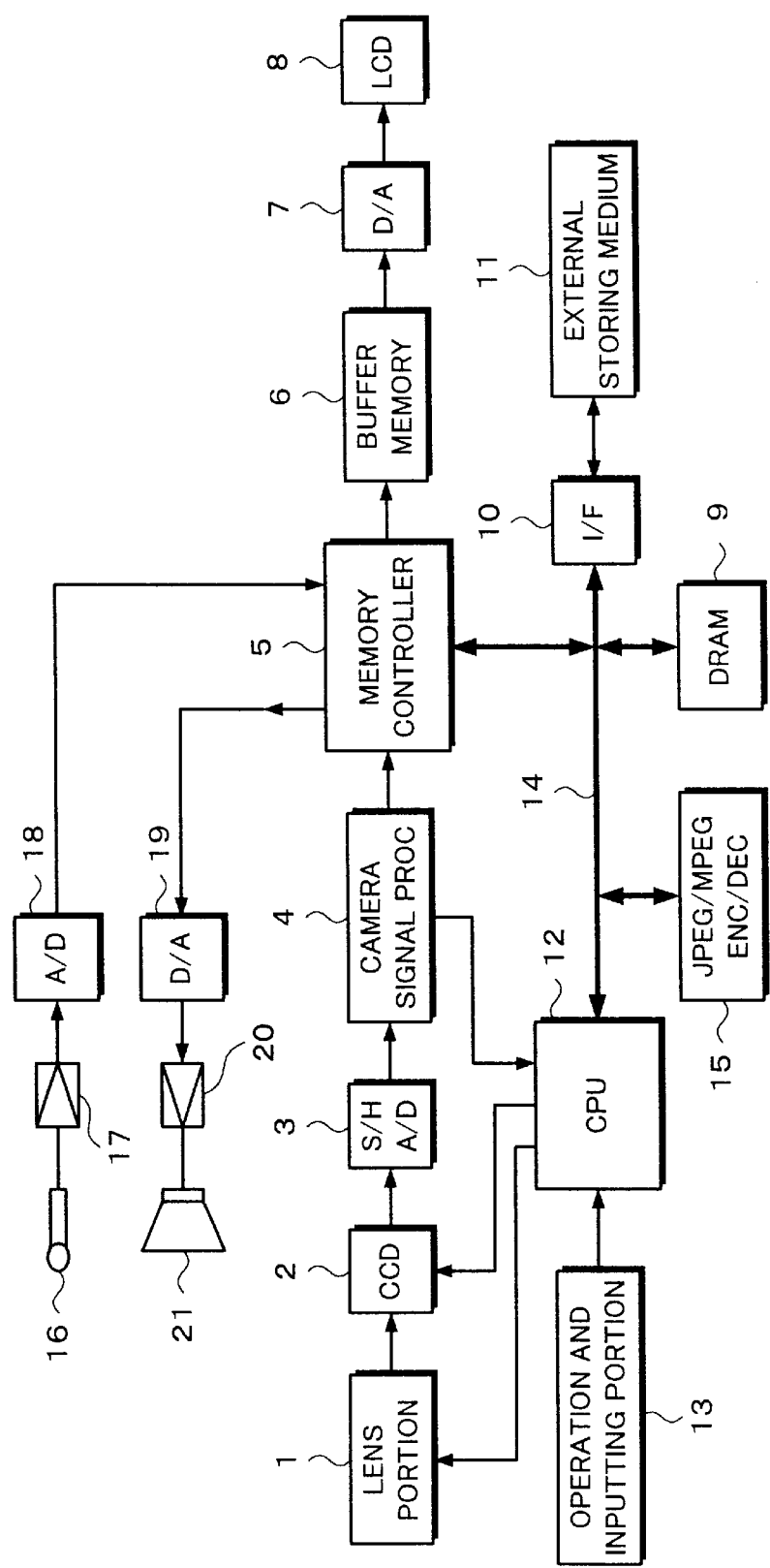
FIG. 1 is a block diagram showing the overall structure of a digital camera according to an embodiment of the present invention.

Next, a digital camera according to an embodiment of the present invention will be described. The digital camera according to an embodiment of the present invention can photograph and record a still picture, an audio attached still picture, and an audio attached moving picture. FIG. 1 shows the overall structure of the digital camera according to the embodiment of the present invention. Referring to FIG. 1, a photographing portion is composed of a lens portion 1 and a CCD (Charge Coupled Device) 2. A control signal is supplied from a CPU 12 to the lens portion 1. In the lens portion 1, an automatic diaphragm control operation and an automatic focus control operation are performed corresponding to the control signal received from the CPU 12. The CCD 2 has a photographing mode and a line thin-out mode (referred to as E-to-E mode). In the photographing mode, all pixels are read. In the line thin-out mode, the number of lines are thinned out by 3. The CCD 2 selects one of the photographing mode and the line thin-out mode corresponding to a control signal received from the CPU 12. The number of pixels of the CCD 2 is 1024×768 corresponding to XGA (eXtended Graphics Array).

Next, the real operation of the CCD 2 will be described. In the still picture photographing mode, signal electric charges are not mixed, but directly read from photo sensors to a vertical charge transfer register. The signal electric charges of all the pixels are successively transferred to a horizontal charge transfer register. In the E-to-E mode or a moving picture photographing mode (that will be described later), since the number of lines through which signal electric charges of photo sensors are supplied to transfer gates is divided, the number of lines is thinned out by for example 3.

It should be noted that the present invention is not limited to the above-described structure. In other words, a solid state image pickup device (not limited to a CCD) that thins out the number of lines, a solid state image pickup device that thins out the number of pixels in horizontal direction, or a solid state image pickup device that thins out the number of lines in vertical direction and the number of pixels in horizontal direction can be used.

In the E-to-E mode, data of a photographed picture is displayed on a displaying portion (LCD 8), not stored in a memory (DRAM 9). In the E-to-E mode, when a picture is photographed, the user sets the angle of view. In addition, in the E-to-E mode, focus point, exposure, and white balance are properly adjusted. In other words, the state of which the user checks an object before pressing the shutter button is the E-to-E mode. In the E-to-E mode, a photographed signal of 1024×256 pixels is obtained from the CCD 2. For example, in the photographing mode, a photographed signal of 16.67 frames per second is output. In contrast, in the E-to-E mode, a photographed signal of 50 frames per second is output.

An output signal of the CCD 2 is supplied to a sample hold and A/D converting portion 3. The sample hold and A/D converting portion 3 generates a digital photographed signal of 10 bits per sample. The sample and A/D converting portion 3 is composed of a correlative dual sampling circuit so as to remove noise, trim waveform, and compensate defective pixels.

The digital photographed signal is supplied to a camera signal processing portion 4. The camera signal processing portion 4 includes a digital clamping circuit, a luminance signal processing circuit, a color signal processing circuit, a contour compensating circuit, a defect compensating circuit, an automatic diaphragm controlling circuit, an automatic focus controlling circuit, an automatic white balance compensating circuit, and so forth. The camera signal processing portion 4 generates a digital component signal (composed of a luminance signal and color difference signals) into which an RGB signal is converted.

Components of the digital photographed signal are supplied from the camera signal processing portion 4 to a memory controller 5. The memory controller 5 is connected to a display buffer memory 6 and a bus 14 of the CPU 12. The buffer memory 6 processes a component signal, generates an RGB signal, and outputs the RGB signal to a D/A converter 7. The D/A converter 7 supplies an analog signal to the LCD 8. The buffer memory 6 outputs the RGB signal at a timing corresponding to a display timing of the LCD 8.

The bus 14 is connected to the DRAM (Dynamic Random Access Memory) 9, the CPU 12, an encoder/decoder 15, and an interface 10. The DRAM 9 is controlled corresponding to an address signal or a control signal received from the memory controller 5 or the CPU 12, respectively. The memory controller 5 has a pixel number converting function for converting the number of pixels corresponding to a picture size or an operation mode that are set by the user.

Figure 2:
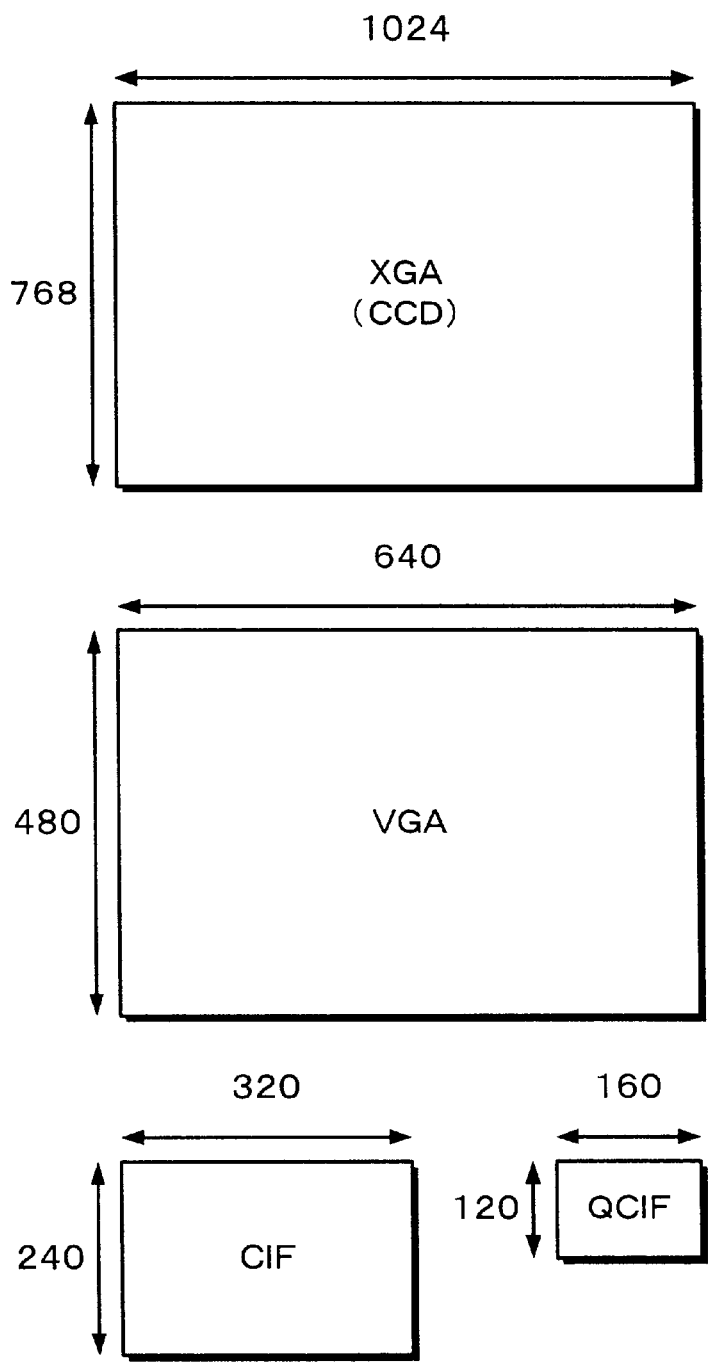
FIG. 2 is a schematic diagram for explaining a picture size according to an embodiment of the present invention.

For example, as shown in FIG. 2, with the digital camera shown in FIG. 1, a picture can be recorded in one of picture formats XGA, VGA (Video Graphics Array: 640×480 pixels), CIF (Common Intermediate Format: 320×240 pixels), and QCIF (Quater CIF: 160×120 pixels). However, since the size of each macro block in the MPEG format is 16×16 pixels, a picture in the picture format QCIF is composed of 160×112 pixels. In other words, the upper portion and the lower portion of a picture in the picture format QCIF are removed. In the picture format XGA, a photographed signal of the CCD 2 is directly recorded. The picture formats XGA and VGA are used for recording still pictures. The picture format CIF is used for recording an audio attached still picture. The picture formats CIF and QCIF are used for recording audio attached moving pictures.

The encoder/decoder 15 compress (encodes) or decompresses (decodes) picture data. For example, when a still picture is processed, the JPEG (Joint Photographic Experts Group) format is used. For example, when a moving picture is processed, the MPEG (Moving Picture Experts Group) format is used. The encoder/decoder 15 has functions corresponding to both the encoding formats. In reality, as a format for compressing a moving picture, MPEG1 format is used.

In the MPEG1 format, there are three picture types that are an I picture, a P picture, and a B picture. When an I picture is encoded, only the information thereof is used. Thus, an I picture can be decoded with only information thereof. When a P picture is encoded, as a predictive picture (that is a reference picture for obtaining a difference), an I picture that has been decoded chronologically before the current P picture is used. Alternatively, a P picture is encoded with only information thereof. When a P picture is encoded, one of these encoding processes is selected for each macro block whichever effective. When a B picture is encoded, an I picture or a P picture that has been decoded as a predictive picture chronologically before the current B picture, an I picture or a P picture that has been decoded as a predictive picture chronologically after the current B picture, or an interpolated picture of these predictive pictures is used. Alternatively, a B picture is encoded with only information thereof. One of the four encoding processes is selected for each macro block whichever the most effective.

Thus, there are four types of macro blocks that are an intra macro block (encoded with only intra-frame information), a forward inter-frame predictive macro block of which a future macro block is predicted with a past macro block, a backward inter-frame predictive macro block of which a past macro block is predicted with a future macro block, and an interpolative inter-frame predictive macro block of which the current macro block is predicted with a future macro block and a past macro block. All macro blocks of an I picture are intra macro blocks. A P picture contains intra macro blocks and forward inter-frame predictive macro blocks. A B picture contains all the four types of macro blocks.

In the MPEG1 format, a DCT process is performed for each block composed of (8×8 pixels). A macro block is composed of four luminance (Y) blocks and two color difference (Cb and Cr) blocks. A slice layer is composed of a predetermined number of macro blocks. A picture layer is composed of a plurality of slice layers. A macro block layer contains a code that represents a macro block type, a code that represents an increase of a macro block address, a horizontal component and a vertical component of a moving vector, a code that represents whether or not six blocks of the current macro block have coefficients, and so forth. The MPEG1 format defines that the first macro block and the last macro block of a slice cannot be skipped. The slide layer contains a code that represents the beginning of the current slice layer.

According to the embodiment of the present invention, when an audio attached still picture or an audio attached moving picture is recorded, video data is encoded in the MPEG format. As will be described later, the encoder/decoder 15 of the digital camera according to the embodiment performs an MPEG encoding process omitting the motion compensation inter-frame predictive process so as to reduce the amount of generated code.

The interface 10 is an interface between an external storing medium 11 and the CPU 12. Examples of the external storing medium are a disk type recording medium (such as a floppy disk) and a memory card. An operation signal is supplied from an operation and inputting portion 13 to the CPU 12. The operation and inputting portion 13 includes a shutter button and various switches that the user operates. In addition, the operation and inputting portion 13 includes a photographing (recording) mode switch of the digital camera and a picture size switch for designating the size of a picture stored to the external storing medium. The operation and inputting portion 13 detects an operation of each button and each switch and supplies the detected signal as an operation signal to the CPU 12. The shutter speed and the diaphragm are automatically set corresponding to an object and a photographing condition. The digital camera may have a plurality of photographing modes as well as the automatic mode.

When a picture is photographed by the digital camera, the CCD 2 is set to the E-to-E mode. In the E-to-E mode, the angle of view is set. Moreover, in the E-to-E mode, focus and exposure are properly set. In the E-to-E mode, the CCD 2 outputs a photographed signal (1024×256 pixels) of which a picture signal that is focused through the lens portion 1 is thinned out by 3 in the vertical direction. The photographed signal is supplied to the camera signal processing portion 4 through an S/H and H/D converting portion 3. A digital component signal is supplied from the camera signal processing portion 4 to the memory controller 5. The photographed signal is written to the buffer memory 6 through the memory controller 5. The photographed signal is read at a timing corresponding to a display timing of the LCD 8 and supplied to the D/A converter 7. The D/A converter 7 converts the photographed signal as a digital signal into an analog signal. The analog signal is displayed on the LCD 8. At this point, the digital camera cuts an area of 960×240 pixels from the area of 1024×256 pixels written to the buffer memory 6, reads data of the cut area from the buffer memory 6 at double speed, and displays the data that is read from the buffer memory 6 to the LCD 8.

Next, when the shutter button is pressed, a picture is photographed. In the still picture photographing mode (in the picture format XGA or VGA) as the photographing mode, when the shutter button is pressed, the digital camera is placed in the still picture photographing mode for photographing a still picture. In the still picture photographing mode, the CPU 12 causes the CCD 2 to operate in the photographing mode. Thus, the CCD 2 outputs a high resolution picture (in the picture format XGA) at a rate of 10 frames per second. Under the control of the memory controller 5, a photographed picture (original picture data (in the picture format XGA or VGA)) is directly stored to the DRAM 9.

When original picture data is stored to the DRAM 9, under the control of the CPU 12, the original picture data is compressed by the encoder/decoder 15. The compressed picture data (JPEG data) is stored to the DRAM 9. In this case, the JPEG data is stored to an area different from the area of the original picture data. Thereafter, under the control of the CPU 12, the JPEG data is read from the DRAM 9. The JPEG data is written to a particular area of the external storing medium 11 (for example, a floppy disk) through the interface 10.

In addition, the digital camera according to the embodiment of the present invention has a function for recording/reproducing an audio signal corresponding to a photographed still picture or a photographed moving picture. As a trigger, when the shutter button is pressed, audio data is recorded for a predetermined time period. In FIG. 1, reference numeral 16 is a microphone. An audio signal is supplied from the microphone 16 to an A/D converter 18 through an amplifier 17. The A/D converter 18 samples the audio signal at a frequency of 32 kHz so as to convert the sampled signal as an analog signal into a digital audio signal. The digital audio signal is supplied from the A/D converter 18 to the memory controller 5. The digital audio signal is temporarily stored to a buffer memory of the memory controller 5.

The CPU 12 reads the content of the buffer memory by an interrupt process and compresses the digital audio signal in MPEG audio layer 2 format (ISO 1172-3) or equivalent format by a software process. The encoding process in the MPEG audio layer 2 format includes a sub-band encoding process, a scaling process, and a bit allocating process. In this case, the encoding process may be performed in MPEG audio layer 1 format or MPEG audio layer 3 format. An MPEG audio stream generated by the software compressing process is written to the DRAM 9. When the MPEG audio stream is written to the DRAM 9, under the control of the CPU 12, a multiplexing process for the MPEG audio stream and the MPEG video stream is performed and the resultant stream is written as a system stream to the DRAM 9. The system stream that is read from the DRAM 9 is recorded to the external storing medium such as a floppy disk in a general-purpose format through the interface 10 such as a floppy disk controller.

In the audio attached moving picture photographing mode, when the shutter button is pressed, the digital camera is placed in a moving picture photographing mode for photographing a moving picture. In the moving picture photographing mode, the CCD 2 operates in the E-to-E mode unlike with the above-described still picture photographing mode. The CCD 2 outputs a photographed signal of which the number of lines is thinned out by 3. This is because in the moving picture photographing mode, it is necessary to follow the motion of a picture and prevent the amount of picture data from increasing. In the moving picture photographing mode, when the shutter button is pressed, pictures are photographed at intervals of a predetermined time period (for example, 5 seconds). However, with the operation of the shutter button, the time period for photographing a moving picture can be prolonged.

In the moving picture photographing mode, one of picture format CIF and QCIF is set as a picture size. The memory controller 5 performs a pixel number converting process corresponding to the selected size. The encoder/decoder 15 compresses the picture data received from the memory controller 5. The compressed picture data (MPEG data) is stored to the DRAM 9. After the picture compressing process and the picture storing process have been completed, as in the still picture photographing mode, under the control of the CPU 12, the MPEG data is written to a predetermined area of the external storing medium 11. For example, in the picture format (picture size) CIF, a moving picture of 15 seconds can be recorded on one floppy disk. In the picture format QCIF, a moving picture of 60 seconds can be recorded on one floppy disk When a still picture (in the picture format XGA or VGA) is reproduced from the external storing medium 11, the CPU 12 reads JPEG data from the external storing medium 11 through the interface 10. The encoder/decoder 15 decompresses the JPEG data. The CPU 12 writes the decompressed still picture data to the DRAM 9. The memory controller 5 reads the still picture data from the DRAM 9. The still picture data is transferred to the buffer memory 26 and displayed on the LCD 8. In this case, the memory controller 5 converts the number of pixels of the still picture. Thus, the reproduced picture is displayed with the same number of pixels as in the E-to-E mode.

When a moving picture is reproduced from the external storing medium 11, the CPU 12 writes MPEG data (a moving picture file) that is read from a floppy disk to the DRAM 9. The CPU 12 causes the encoder/decoder 15 to decompress data that is read from the DRAM 9 in the MPEG format. The memory controller 5 converts the number of pixels of the decompressed picture data corresponding to the size of the picture that has been recorded. The resultant data is displayed on the LCD 8. When a moving picture (in the picture format CIF or QCIF) is reproduced and displayed, the moving picture in a reduced size is displayed on the LCD 8.

When a still picture or a moving picture and an audio signal corresponding thereto are reproduced, the CPU 12 stores a system stream reproduced from the external storing medium 11 to the DRAM 9. The CPU 12 separates an audio stream from the system stream that is read from the DRAM 9 and decodes the audio stream in the MPEG audio format. The resultant audio stream is transferred to the buffer memory of the memory controller 5. A D/A converter 19 converts the audio data stored in the buffer memory into an analog audio signal. The resultant analog audio signal is reproduced by a speaker 21 through an amplifier 20.

According to the embodiment of the present invention, when a still picture is photographed, original picture data is stored to the DRAM 9. Thereafter, the encoder/decoder 15 compreses the picture data in the JPEG format and stores the resultant data as JPEG data to another area of the DRAM 9. Thereafter, the digital camera stores the JPEG data to the external storing medium 11. When a moving picture is photographed, the digital camera stores one photographed picture to a working area of the DRAM 9. The encoder/decoder 15 compresses the picture in the MPEG1 format. The resultant compressed data as MPEG data is stored to another area of the DRAM 9. This process is performed for each frame of the moving picture. The digital camera stores the MPEG data to the external storing medium 11. When a moving picture is photographed, an audio attached moving picture photographing operation of which audio is recorded along with a moving picture can be performed.

In addition, the digital camera can perform an audio attached still picture photographing operation. In other words, when a still picture is photographed, with an audio signal for a predetermined time period after the shutter button is pressed or while the shutter button is being pressed, the digital camera generates an MPEG audio stream. Moreover, the digital camera writes a system stream of which the MPEG audio stream and an MPEG video stream of a still picture has been multiplexed to the DRAM 9 and also recordes the system stream to the external storing medium 11.

Next, the audio attached still picture photographing operation will be described. Picture data of one picture in high resolution (the picture format XGA or VGA) photographed by the CCD 2 in the photographing mode is stored to the DRAM 9. The CPU 12 reads the original picture data from the DRAM 9, converts the number of pixels of the picture data, and generates a reduced picture in the picture format CIF. The encoder/decoder 15 compresses the reduced picture in the MPEG format. The encoder/decoder 15 generates an I picture with the original reduced picture and writes the I picture to the DRAM 9.

After I picture, fixed data as a P or B picture is placed in a stream. The fixed data represents that the moving vectors of all macro blocks of one entire frame are 0. In addition, the fixed data represents a predictive code of the preceding frame. The time period of a P picture or a B picture is almost equal to the time period of the audio signal. When such a video stream is decoded and displayed, the picture of the preceding frame is copied and displayed. Thus, apparently, for the time period of a P picture or a B picture, a still picture can be displayed.

An audio signal for a predetermined time period after the shutter button is pressed as a trigger (for example, while the shutter button is being pressed) is supplied to the buffer memory of the memory controller 5 through the microphone 16, the amplifier 17, and the A/D converter 18. The CPU 12 encodes the audio data stored in the buffer memory corresponding to the MPEG audio format so as to generate an MPEG audio stream.

The CPU 12 multiplexes the MPEG video stream and the MPEG audio stream and generates the resultant stream as an MPEG system stream. The CPU 12 stores the MPEG system stream to a record data area of the DRAM 9. The system stream stored in the record data area of the DRAM 9 is recorded to the external storing medium (for example, a floppy disk) through the interface 10.

After the MPEG system stream has been recorded to the external storing medium 11, the CPU 12 reads the original picture data (in the picture format XGA or VGA) from the DRAM 9 and causes the encoder/decoder 15 to compress the original picture data in the JPEG format. Thereafter, the CPU 12 rewrites the JPEG still picture stream to the record data area of the DRAM 9. The still picture stream stored in the record data area of the DRAM 9 is recorded to the external storing medium 11 (for example, a floppy disk) through the interface 10. Thus, in the audio attached still picture photographing operation, a JPEG file containing only a still picture and an MPEG file containing an I picture (photographed at the same time as the still picture) and audio information are simultaneously generated.

Next, with reference to FIG. 3, the MPEG encoding process used in the audio attached still picture photographing operation will be described in detail. A picture signal of one still picture (in the picture format CIF or QCIF into which the number of pixels of a still picture signal in the picture format XGA or VGA is converted) is input from an input terminal 23 of a video signal processing apparatus to an I picture encoder 24. The I picture encoder 24 converts the input picture signal into an I picture corresponding to the MPEG video format. In addition, an audio signal is input from a microphone 16 or a line input terminal to an input terminal 25. The audio signal received from the input terminal 25 is supplied to an MPEG audio encoder 26. The MPEG audio encoder 26 converts the audio signal into a signal corresponding to the MPEG audio format.

A P/B picture generator 27 generates fixed data corresponding to the picture size without performing a motion compensation inter-frame predicting process such as a motion detecting process. Thus, it is not necessary to supply a video signal to the P/B picture generator 27. As described above, the fixed data represents that the moving vectors of all macro blocks of one entire frame are 0. In addition, the fixed data represents a predictive code of the preceding frame. Thus, the fixed data is a picture of the preceding frame. More practically, a picture in the picture format CIF or QCIF is treated as one slice. All macro blocks other than the first macro block and the last macro block of the slice are skipped. The first macro block and the last macro block are encoded in such a manner that the moving vectors thereof are 0. Although one picture may be divided into a plurality of slices, the header information will increase.

Since the number of macro blocks to be skipped is encoded, the data amount of a picture generated by the P/B picture generator 27 varies corresponding to the picture size. In reality, the data amount of a P picture corresponding to the MPEG1 format in the picture format CIF is 28 bytes. The data amount of a P picture corresponding to the MPEG1 format in the picture format QCIF is 19 bytes. Thus, when the same picture is repeatedly placed in a stream and a decoded picture is displayed apparently as a still picture, with such a P or B picture, the data amount can be remarkably decreased.

Figure 3:
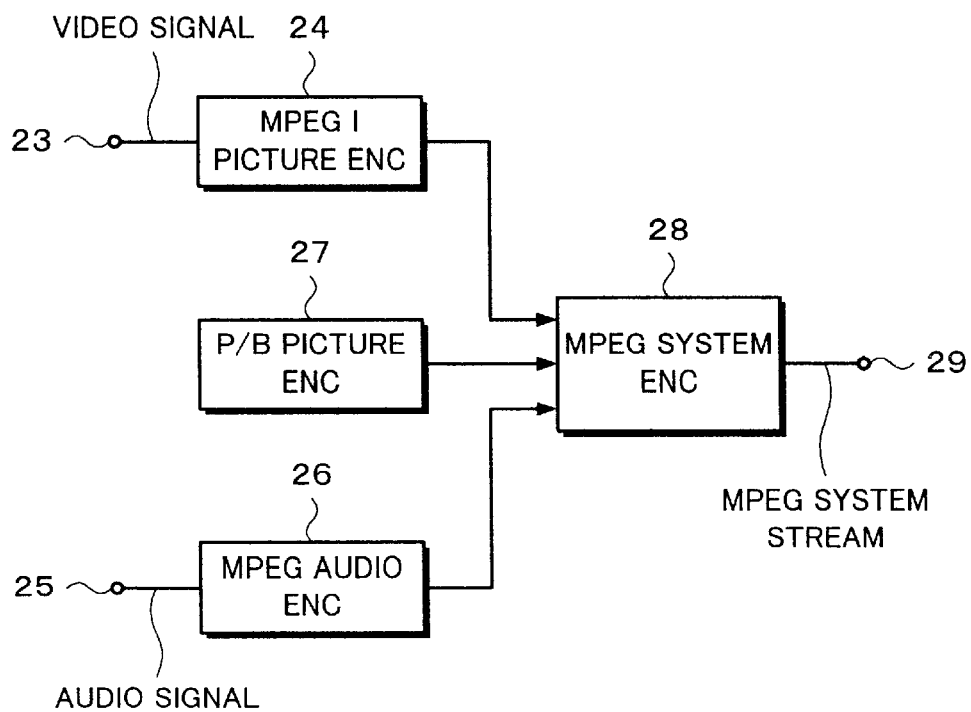
FIG. 3 is a block diagram showing an example of the structure of an encoding apparatus according to the present invention.

In FIG. 3, reference numeral 28 is an MPEG system encoder. The MPEG system encoder 28 multiplexes signals received from the I picture encoder 24, the P/B picture generator 27, and the MPEG audio encoder 26 corresponding to the MPEG system format and supplies the multiplexed signal as an MPEG system stream to an output terminal 29. As described above, the MPEG system stream is stored to the DRAM 9. The I picture encoder 24 is contained in the encoder/decoder 15. The P/B picture generator 27, the MPEG audio encoder 26, and the MPEG system encoder 28 are accomplished as software processes of the CPU 12.

The structure shown in FIG. 3 can be applied to the audio attached moving picture photographing operation as well as the audio attached still picture photographing operation. In the audio attached moving picture photographing operation, a video signal equivalent to one frame of a photographed moving picture (in the picture format CIF or QCIF into which the number of pixels of a photographed signal of the CCD 2 is converted) is supplied to the I picture encoder 24. In addition, the P/B picture generator 27 generates fixed data without performing a motion compensation inter-frame predicting process.

Figure 4:
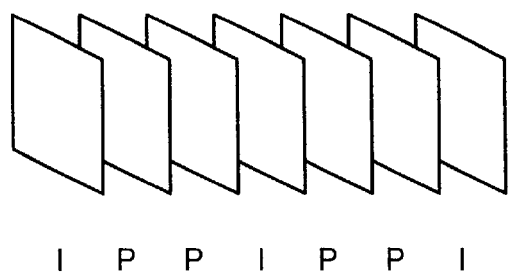
FIG. 4 is a schematic diagram showing a frame structure of an output signal of the encoding apparatus according to the present invention.

FIG. 4 shows an example of a frame structure of which a P or B picture received from the P/B picture generator 27 is placed after an I picture received from the I picture encoder 24 in the audio attached moving picture photographing operation. Each I picture is followed by two P pictures. The two P pictures are generated by the P/B picture generator 27. The data amount of the P pictures is much smaller than that of the I picture. In the example shown in FIG. 4, one out of three frames are thinned out. Thus, the frame rate is decreased by 3. Consequently, a frame rate of for example 25 Hz that satisfies the minimum frame rate of the MPEG standard can be accomplished. However, the number of P or B pictures placed between I pictures depends on a desired frame rate. When at least one P or B picture is placed between I pictures, the frame rate can be decreased.

Figure 5:
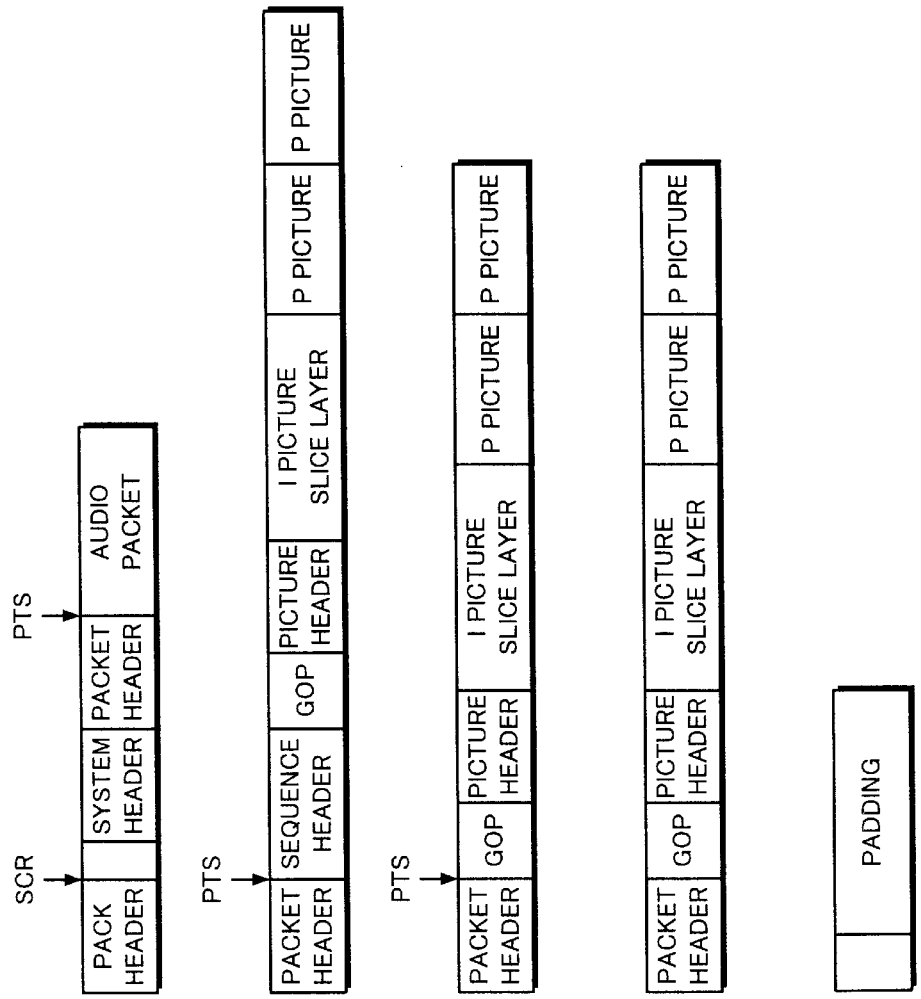
FIG. 5 is a schematic diagram showing an example of a data structure of a system stream that is output from an encoding apparatus in an audio attached moving picture photographing operation.
Figure 6:
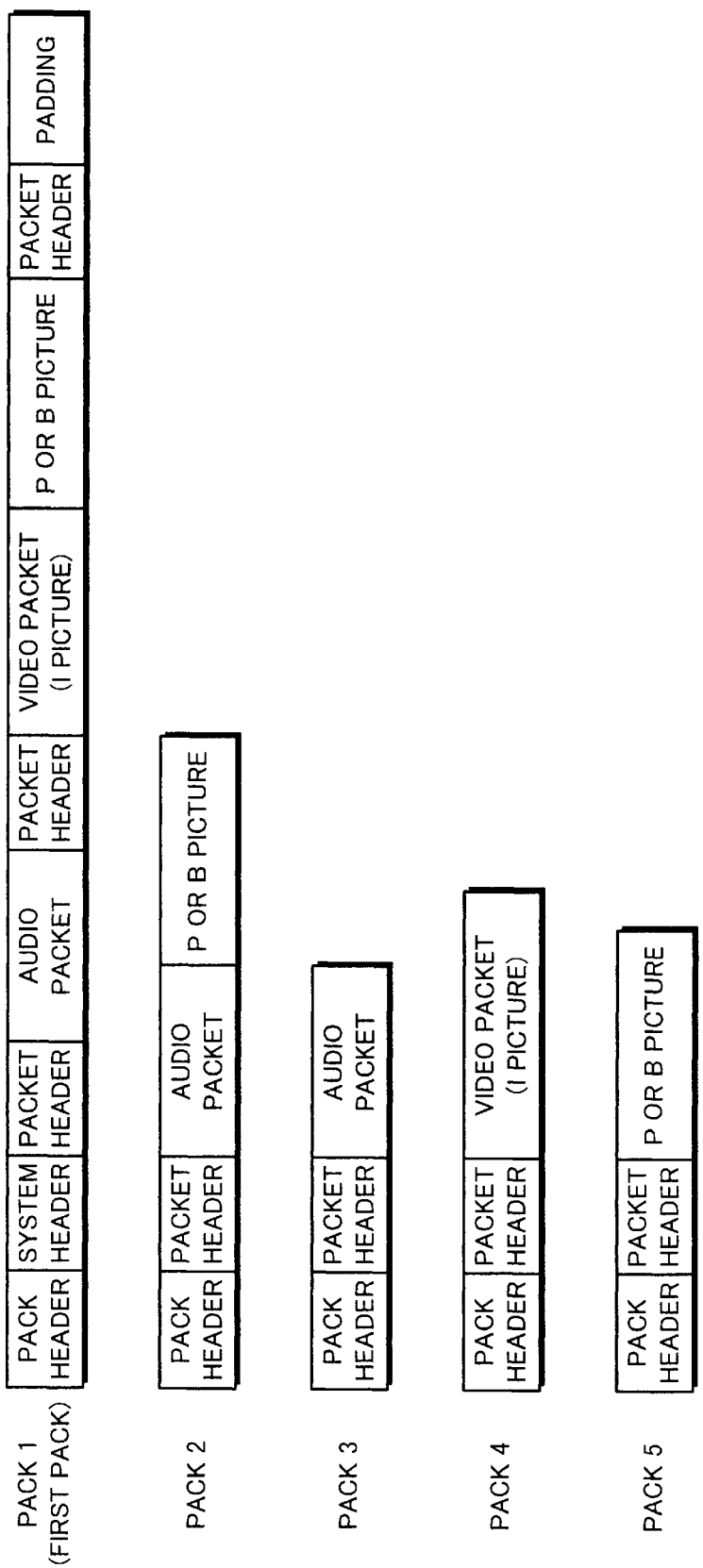
FIG. 6 is a schematic diagram showing an example of a data structure of a system stream that is output from an encoding apparatus in an audio attached still picture photographing operation.

Next, with reference to FIGS. 5 and 6, an example of the structure (pack structure) of a system stream generated by the MPEG system encoder 28 will be described. FIG. 5 shows a pack structure in the audio attached moving picture photographing operation. FIG. 6 shows a pack structure in the audio attached still picture photographing operation. The pack structure in the moving picture photographing operation is based on a system stream corresponding to the MPEG1 format. In addition, to effectively multiplex data streams, the pack structure has the following features.

The size of one pack is fixed. One pack contains audio access units and video access units so that the time period of the audio access units is equal to the time period of the video access units. The MPEG system encoder 28 places information of for example 10 audio frames and information of for example 9 video frames in one pack. The time period of one video frame is $\frac{1}{25}$ seconds. An access unit in the MPEG audio layer 2 format contains data of 1152 samples per frame. The audio sampling frequency is 32 kHz. Thus, the time period of the above-described information is equivalent to 0.36 seconds.

In addition, the MPEG system encoder 28 places data of a multiple of access units in one packet. In addition, the MPEG system encoder 28 places an audio packet with a fixed length at the beginning of a pack. Moreover, the MPEG system encoder 28 places one packet every three video frames (for example, one I picture and two P pictures). The MPEG system encoder 28 places a padding stream packet (dummy data) at the end of a pack so that the length of the pack is fixed.

As shown in FIG. 5, the first packet contains 10 frames of audio information. Each of the second, third, and third packets contains three frames of video information. The last packet contains a padding stream.

In such a pack structure, when a picture is photographed, data that is output from the audio encoder and data that is output from the video encoder can be multiplexed on real time basis, not buffered. In addition, an I picture is contained in a pack with a fixed length by a rate control. Since the length of the pack is fixed, values of SCR (System Clock Reference) and PTS (Presentation Time Stamp) can be represented with a simple adding process.

Next, with reference to FIG. 6, a pack structure in the audio attached still picture photographing operation will be described. Pack 1 (first pack) contains a still picture (I picture). In other words, pack 1 contains an audio packet, a video packet having an I picture of which a still picture has been encoded, and a P or B picture (at least one picture) that have the same PTS. Pack 2 contains an audio packet and a P or B picture (at least one picture).

When a picture is encoded, the MPEG system encoder 28 performs an encoding process for the picture with pack 1 so that the decoder can reproduce a still picture and an audio signal. In the later packs, to reduce the data amount, the MPEG system encoder 28 places a structure of pack 2. Thus, while a still picture is being displayed, an audio signal corresponding thereto can be reproduced. Since video information is required for a time period equal to that of audio information to be recorded, the MPEG system encoder 28 places video packets for the time period with the structure of pack 2. However, when it is not necessary to reduce the code amount, the MPEG system encoder 28 may form a system stream with the structure of only pack 1.

As an example of the structure of a pack, as with pack 3 shown in FIG. 6, the number of packets per pack may be one rather than the structures of pack 1 and pack 2. As with pack 4 and pack 5, an I picture and a P or B picture may be placed in two successive packs. In addition, there may be a plurality of still pictures to be displayed. In this case, when pack 1 is placed in a stream at intervals of a predetermined time period, while different still pictures are being reproduced, audio data corresponding thereto can be reproduced as a slide show.

Figure 7:
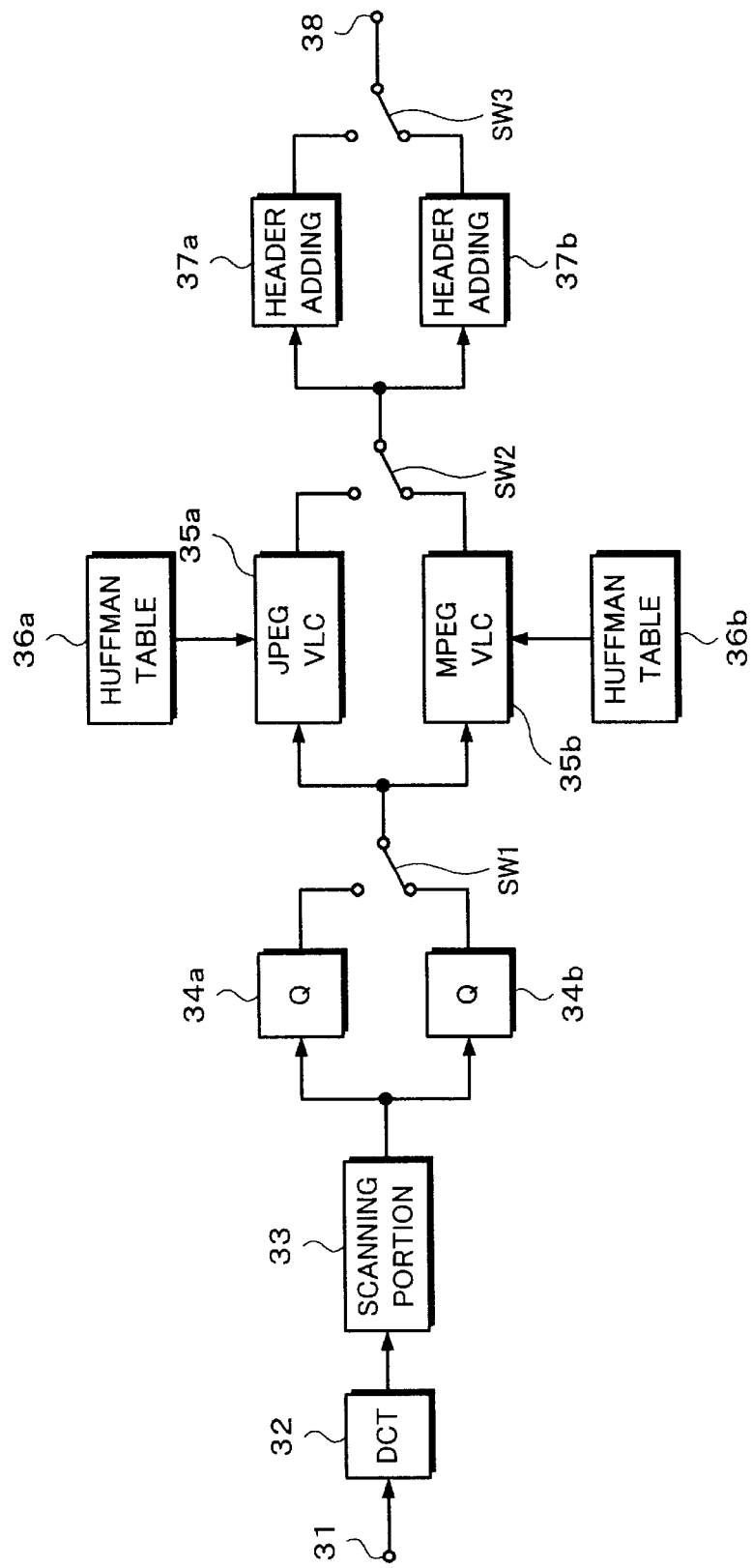
FIG. 7 is a block diagram showing the structure of an encoder/decoder according to an embodiment of the present invention.

According to the embodiment of the present invention, the encoder/decoder 15 should encode/decode a picture corresponding to the JPEG format and MPEG format. FIG. 7 shows an example of the structure of the encoder/decoder 15. In the embodiment of the present invention, when a picture is encoded corresponding to the MPEG format, an inter-frame motion compensation predictive process is not performed. As a result, a structure that shares the DCT process between the JPEG encoder and the MPEG encoder can be effectively used.

In FIG. 7, a picture data as blocks (each of which is composed of (8×8 pixels)) is supplied to an input terminal 31. The picture data is supplied from the input terminal 31 to a DCT portion 32. The DCT portion 32 performs a cosine transform process for the picture data and generates 64 coefficients (one DC component and 63 AC components) corresponding to individual pixel data of each block. The coefficient data is supplied to a scanning portion 33. The scanning portion 33 scans the coefficient data corresponding to one of two scanning methods (zigzag scanning method and alternate scanning method).

An output signal of the scanning portion 33 is supplied to quantizing portions 34a and 34b. The quantizing portions 34a and 34b quantize the coefficient data using respective scaling factors. One of quantized outputs is selected by a switch circuit SW1. When the JPEG encoding process is performed, the switch circuit SW1 selects the quantized output of the quantizing portion 34a. When the MPEG encoding process is performed, the switch circuit SW1 selects the quantized output of the quantizing portion 34b.

The quantized output selected by the switch circuit SW1 is supplied to a JPEG variable length code encoding portion 35a and an MPEG variable length code encoding portion 35b. Since the JPEG variable length code encoding process and the MPEG variable length code encoding process use different Huffman tables each other, two Huffman tables 35a and 35b are provided. When the JPEG encoding process is performed, the AC components of the coefficient data are encoded with variable length code by the variable length code encoding portion 35a and the Huffman table 36a. The encoded output is selected by the switch circuit SW2. When the MPEG encoding process is performed, the AC components of the coefficient data are encoded with variable length code by the variable length code encoding portion 35b and the Huffman table 36b. The encoded output is selected by the switch circuit SW2.

The switch circuit SW2 is connected to header adding portions 37a and 37b. The header adding portion 37a adds a header corresponding to the JPEG format to the stream. The header adding portion 37b adds a header corresponding to the MPEG format to the stream. The resultant stream is obtained from an output terminal 38 through a switch SW3 that operates corresponding to whether the JPEG encoding process or the MPEG encoding process is performed.

Although the quantizing portions 34a and 34b are shown as different structural elements, many parts of them can be structured as common hardware portions. Likewise, many parts of the header adding portions 37a and 37b, the JPEG variable length encoding portion 35a, and the MPEG variable length code encoding portion 35b can be structured as common hardware portions. On the other hand, the Huffman tables 36a and 36b should be separately provided as different hardware portions. FIG. 7 shows the structure of the encoder portion of the encoder/decoder 15. The decoder portion is composed of a header separating portion, a variable length code decoding portion, an inversely quantizing portion, and an inversely DCT portion. As with the encoder portion, many portions of the decoder portion can be structured as common hardware portions. Since the inter-frame motion compensation predictive process is omitted from the MPEG format encoding process, the hardware scale of the encoder/decoder can be decreased. Thus, an integrating circuit of the encoder/decoder can be easily designed.

According to the present invention, as examples of the external storing medium 11, various types of disk mediums such as a detachable card and a floppy disk can be used. In addition, the encoding process according to the present invention can be applied for data transmissions to a network, RS232C, non-contact type IrDA, and so forth.

According to the first aspect and the third aspect of the present invention, since the motion compensation interframe predictive process is not performed, the hardware scale and the number of process steps of software can be remarkably decreased. In addition, since encoded output data in the MPEG format or equivalent format can be obtained, the encoded output data can be easily used by a personal computer. With a small scale of hardware or a small number of process steps of software, as functions of a digital still camera, a moving picture recording function can be provided along with a still picture recording function. In addition, since the amount of code that is generated is small, a photographed moving picture can be recorded to an external storing medium.

According to the second aspect and the fourth aspect of the present invention, a function for simultaneously recording a still picture and an audio signal can be accomplished for a digital camera. In addition, when an audio attached still picture is recorded, only a still picture can be recorded. Thus, corresponding to a desired application, recorded data can be used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A camera apparatus for encoding a video signal received from photographing means in MPEG video format or equivalent format, encoding an audio signal received from audio inputting means in MPEG audio format or equivalent format, multiplexing the encoded MPEG video signal and the encoded MPEG audio signal, storing the multiplexed data to memory means, the camera apparatus comprising:

I picture generating means for encoding the video signal received from the photographing means corresponding to an intra-frame encoding process so as to generate an I picture in the MPEG video format or equivalent format; and controlling means for controlling a storing process of the multiplexed data to the memory means, wherein said controlling means generates a P picture or a B picture in the MPEG video format or equivalent format in such a manner that moving vectors of all macro blocks thereof are 0 and the chronologically preceding picture is copied as an encoded picture, wherein said controlling means encodes the audio signal received from the audio inputting means in the MPEG audio format or equivalent format so as to generate MPEG audio data, wherein said controlling means multiplexes the I picture, the P picture or the B picture, and the MPEG audio data so as to generate the multiplexed data; and, wherein the multiplexed data is composed of a plurality of packs, the top pack containing the MPEG audio data and the data of the I picture of the MPEG video data.

2. The camera apparatus as set forth in claim 1, wherein the multiplexed data is composed of packs with a fixed length, each pack containing MPEG video data and MPEG audio data, the time period of the MPEG video data being the same as the time period of the MPEG audio data.

3. The camera apparatus as set forth in claim 2, wherein each of the packs contains N video frames and/or N audio frames (where N is any integer).

4. The camera apparatus as set forth in claim 1, wherein the multiplexed data is composed of a plurality of packs, and wherein packs containing the data of the I picture of the MPEG video data are placed at predetermined intervals.

5. The camera apparatus as set forth in claim 1, further comprising:
recording means for recording the multiplexed data to a record medium.

6. The camera apparatus as set forth in claim 1, further comprising:
operating means for causing the camera apparatus to perform a recording operation,
wherein said controlling means encodes an audio signal in a time period of which said operating means is being pressed so as to generate MPEG audio data.

7. The camera apparatus as set forth in claim 1, further comprising:
operating means for causing the camera apparatus to perform a recording operation,
wherein said controlling means encodes an audio signal after said operating means is pressed until a predetermined time period elapses so as to generate MPEG audio data.

8. The camera apparatus as set forth in claim 1, further comprising:
reproducing means for reproducing the multiplexed data from a record medium;
video decoding means for decoding MPEG video data;
displaying means for displaying video data; and
audio outputting means for outputting audio data,
wherein said controlling means causes the memory means to store the multiplexed data reproduced from said reproducing means and decodes MPEG audio data of the multiplexed data stored in the memory means,
wherein said video decoding means decodes MPEG video data of the multiplexed data stored in the memory means,
wherein said displaying means displays the decoded video data, and
wherein said audio outputting means outputs the decoded audio data.

9. The camera apparatus as set forth in claim 1,
wherein the photographing means outputs a video signal in XGA or VGA format when a still picture photographing mode has been selected in the camera apparatus, and
wherein the photographing means outputs a video signal of which the input video signal received from the photographing means has been thinned out by around 3 when a moving picture photographing mode has been selected in the camera apparatus.

10. A recording method for a camera apparatus for encoding a video signal received from photographing means in MPEG video format or equivalent format, encoding an audio signal received from audio inputting means in MPEG audio format or equivalent format, multiplexing the encoded MPEG video signal and the encoded MPEG audio signal, storing the multiplexed data to memory means, the recording method comprising the steps of:
encoding the video signal received from the photographing means corresponding to an intra-frame encoding process so as to generate an I picture in the MPEG video format or equivalent format;
generating a P picture or a B picture in the MPEG video format or equivalent format in such a manner that moving vectors of all macro blocks thereof are 0 and the chronologically preceding picture is copied as an encoded picture;
encoding the audio signal received from the audio inputting means in the MPEG audio format or equivalent format so as to generate MPEG audio data;
multiplexing the I picture, the P picture or the B picture, and the MPEG audio data so as to generate the multiplexed data; and
storing the multiplexed data to the memory means;
wherein the multiplexed data is composed of a plurality of packs, the top pack containing the MPEG audio data and the data of the I picture of the MPEG video data.

11. The recording method as set forth in claim 10,
wherein the multiplexed data is composed of packs with a fixed length, each pack containing MPEG video data and MPEG audio data, the time period of the MPEG video data being the same as the time period of the MPEG audio data.

12. The recording method as set forth in claim 10,
wherein each of the packs contains N video frames and/or N audio frames (where N is any integer).

13. The recording method as set forth in claim 10,
wherein the multiplexed data is composed of a plurality of packs, and
wherein packs containing the data of the I picture of the MPEG video data are placed at predetermined intervals.

14. The recording method as set forth in claim 10, further comprising the step of:
recording the multiplexed data to a record medium.

15. The recording method as set forth in claim 10, further comprising the step of:
encoding an audio signal in a time period of which operating means that causes the camera apparatus to perform a recording operation is being pressed so as to generate MPEG audio data.

16. The recording method as set forth in claim 10, further comprising the step of:
encoding an audio signal after operating means that causes the camera apparatus to perform a recording operation is pressed until a predetermined time period elapses so as to generate MPEG audio data.

17. The recording method as set forth in claim 10, further comprising the steps of:
storing the multiplexed data reproduced from a record medium to the memory means and decoding MPEG audio data of the multiplexed data stored in the memory means;
decoding MPEG video data of the multiplexed data stored in the memory means;
displaying the decoded video data; and
outputting the decoded audio data.

18. The recording method as set forth in claim 10,
wherein the photographing means outputs a video signal in XGA or VGA format when a still picture photographing mode has been selected in the camera apparatus, and
wherein the photographing means outputs a video signal of which the input video signal received from the photographing means has been thinned out by around 3 when a moving picture photographing mode has been selected in the camera apparatus.

* * * * *